Nov. 6, 1951     S. F. LUNDGREN ET AL     2,574,217
DENTIST'S MIRROR
Filed May 6, 1950
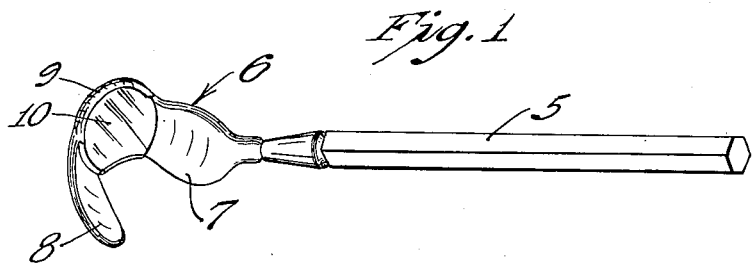
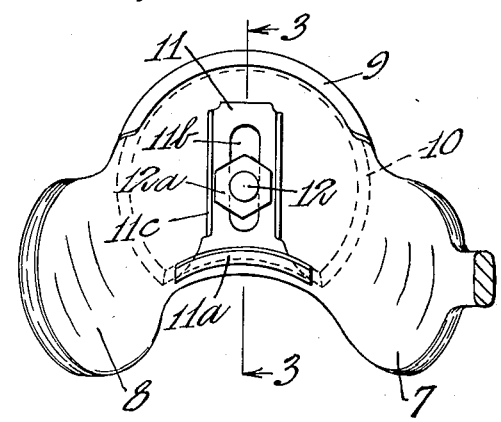
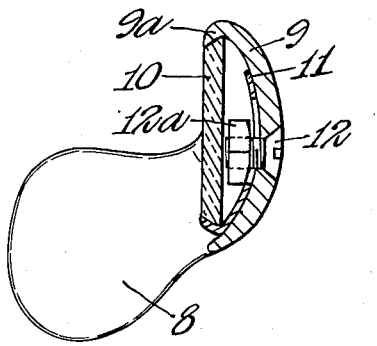
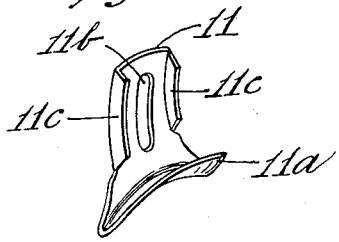
Inventors
Stanley F. Lundgren
Robert A. Olsen
By Williamson & Williamson
Attorneys Patented Nov. 6, 1951

2,574,217

UNITED STATES PATENT OFFICE 2,574,217

DENTIST'S MIRROR

Stanley F. Lundgren, Minneapolis, and Robert A. Olsen, Excelsior, Minn.; said Olsen assignor to said Lundgren Application May 6, 1950, Serial No. 160,444

4 Claims. (Cl. 32—69)

This invention relates generally to dental mirrors.

It is an object of our invention to provide a novel and improved dental mirror designed to protect the reflective surface and producing an ingeniously constructed mirror clamping bracket which securely holds the mirror in position, while permitting easy removal thereof.

It is another object to provide a dental mirror having a pair of light reflecting protective wings extending outwardly from the centrally disposed reflective surface and constructed to define a definite operative area and facilitating maintaining said area in a dry optimum condition.

More specifically, it is an object to provide a dental mirror having an image reflecting surface with a concave bottom portion and a pair of laterally extending dished light reflective wing members adapted to define a definite operative area and to focus the light substantially uniformly over said area, while permitting optimum positioning of the image reflecting surface.

These and other objects and advantages of our invention will more fully appear from the following description made in connection with the accompanying drawings wherein like reference characters refer to similar parts throughout the several views and in which:

Fig. 1 is a perspective view of my assembled dental mirror;

Fig. 2 is a front elevational view of the mirror holding structure showing the mirror in dotted lines;

Fig. 3 is a vertical sectional view taken substantially along the line 3—3 of Fig. 2; and Fig. 4 is a perspective view showing the mirror retaining bracket.

As illustrated in the accompanying drawings we provide a dental mirror having a handle 5 removably connected with the mirror holding portion designated as an entirety by the numeral 6. The mirror holding portion 6 has a pair of inwardly dished protective wing members 7 and 8 and a central mirror mounting socket 9. The inner dished surface of these wing members are highly polished to reflect the light onto the operative area disposed therebetween. The upper portion of the mounting socket 9 has an overhanging retaining flange 9a extending around the upper portion thereof.

An image reflecting mirror element 10 has a circular upper portion to be received under the overhanging retaining flange 9a and has a concavely formed recess in the bottom thereof. A mirror retaining clamp 11 is slidably mounted within the mounting socket 9 and has an upwardly convexly curved retaining flange 11a formed at the bottom thereof to cooperatively receive the concave recess of the mirror element 10. The outer periphery of said mirror element is bevelled, as illustrated in the drawings, and the flanges 9a and 11a are formed to closely embrace the engaged portions of this bevelled peripheral surface. The clamp 11 has an elongated slot 11b formed therein and a clamping screw 12 is inserted through the central portion of the rear of the socket member 9 and extends through the elongated slot 11b. A nut 12a is threadably mounted on the inside of said screw 12 and is prevented from turning by the struckup ears 11c.

The mirror element 10 is easily removed by loosening the screw 12 to permit the clamp 11 to be shifted downwardly and thereby permit the withdrawal of the mirror from the socket. To reinsert the mirror into the socket the same is inserted under the retaining flange 9a and the flange 11a of the clamp 11 is shifted upwardly to engage the lower recess and held in clamping position while the screw 12 is tightened. It has been found that the image reflecting surface of these dental mirrors, with repeated sterilization, become damaged and require replacement, and therefore it is a decided advantage to provide a replaceable mirror element to obviate the necessity of replacing the entire mounting structure to replace the image reflecting mirror element itself. The mirror also often becomes damaged and scratched through contact with the rotary sanding disc used in dental work and requires replacement.

The entire mirror holding portion 6 of our improved dental mirror is constructed to define a definite operative area which is protected from contact with the mouth membranes and which receives a uniformly distributed relatively high intensity light which is focused thereon by the light reflective wing members 7 and 8. These wing members engage the tissue of the mouth on each side of the operative area and displace the same laterally away from said area and downwardly therefrom to provide an increased saliva reservoir on each side thereof to permit the entire operative area to be maintained in a dry optimum condition while the dentist is working thereon. This mirror unit, of course, produces all of these advantages simultaneously and materially increases the efficiency of any work being performed. The recess in the lower portion of the mirror permits optimum positioning thereof and accurately reflects the image of the entire operative area. The concavely dished wing members provide not only a focusing of the light on the operative area, but also provide additional clearace of the sanding disc which is usually disposed in upright position therebetween and which, of course, is circular in shape. The recess in the lower portion of the image reflecting mirror element 10 also serves to permit the mirror to be easily locked into the socket 9 by the clamp 11.

It will be seen that we have provided a relatively simple, yet highly efficient dental mirror unit adapted to define a definite operative area and to maintain optimum light conditions as well as maintaining the area in a relatively dry state. The mirror element itself is easily replaceable and when in assembled position is securely locked therein against rotation or any other shifting movement.

It will, of course, be understood that various changes may be made in the form, details, arrangement and proportions of the parts without departing from the scope of our invention.

What we claim is:

1. A dental mirror unit comprising a central reflective mirror element, a pair of wing members respectively fixed at the sides of said mirror element and extending rearwardly therefrom, the bottom portion of said mirror element being concavely recessed to facilitate optimum positioning thereof within a patient's mouth and permit easy protective positioning of said wing members on each side of the row of teeth being examined, and a handle fixed to one of said wing members and extending rearwardly therefrom.

2. A dental mirror unit comprising a central socket member, an inwardly extending retaining flange formed around at least a portion of the periphery of said socket member and adapted to receive a reflective mirror element, a reflective mirror element received in said socket and said flange, a retaining clamp shiftably mounted in said socket for movement toward or away from said flange and including a clamping flange disposed in opposed relation to said first mentioned flange and adapted to conform to the peripheral surface of the engaged portion of a reflective mirror element to tightly hold said mirror element when clamped thereagainst, means for releasably securing said clamping element in mirror clamping position, and a handle connected to said socket member.

3. The structure set forth in claim 2 and concave peripheral recesses respectively formed at the lower portions of said socket member and mirror element with the flange of said clamping member being curved convexly upwardly to be tightly clamped and received in said cooperating recesses.

4. The structure set forth in claim 3 and a pair of protective wing members fixed to said socket and extending rearwardly thereof, one of said wing members interconnecting said handle and said socket member.

STANLEY F. LUNDGREN.
ROBERT A. OLSEN.

REFERENCES CITED

The following references are of record in the file of this patent:

UNITED STATES PATENTS

| Number | Name | Date |
|---|---|---|
| 548,817 | Platt | Oct. 29, 1895 |
| 893,293 | Wright et al. | July 14, 1908 |

FOREIGN PATENTS

| Number | Country | Date |
|---|---|---|
| 101,276 | Switzerland | Sept. 17, 1923 |